(12) United States Patent
Mammadli et al.

(10) Patent No.: US 11,989,310 B2
(45) Date of Patent: May 21, 2024

(54) METHOD AND SYSTEM FOR FACILITATING IDENTIFICATION OF ELECTRONIC DATA EXFILTRATION

(71) Applicant: Royal Bank of Canada, Toronto (CA)

(72) Inventors: Nariman Mammadli, Toronto (CA); Dhanya Jothimani, Toronto (CA); Ramanpreet Singh, Toronto (CA); Cathal Smyth, Toronto (CA); Felix Kurmish, Toronto (CA); Amit Kumar Tiwari, Toronto (CA)

(73) Assignee: ROYAL BANK OF CANADA, Toronto (CA)

( * ) Notice: Subject to any disclaimer, the term of this patent is extended or adjusted under 35 U.S.C. 154(b) by 170 days.

(21) Appl. No.: 17/550,783

(22) Filed: Dec. 14, 2021

(65) Prior Publication Data

US 2023/0185926 A1   Jun. 15, 2023

(51) Int. Cl.
*G06F 21/60* (2013.01)
*G06F 21/50* (2013.01)
*H04L 51/046* (2022.01)
*H04L 51/08* (2022.01)

(52) U.S. Cl.
CPC .............. *G06F 21/60* (2013.01); *G06F 21/50* (2013.01); *H04L 51/046* (2013.01); *H04L 51/08* (2013.01)

(58) Field of Classification Search
USPC .......................................................... 726/26
See application file for complete search history.

(56) References Cited

U.S. PATENT DOCUMENTS

| | | | |
|---|---|---|---|
| 10,873,592 B1* | 12/2020 | Singh | G06F 11/3476 |
| 2020/0042837 A1* | 2/2020 | Skinner | G06F 18/217 |
| 2020/0396258 A1* | 12/2020 | Jeyakumar | G06N 20/00 |
| 2021/0320871 A1* | 10/2021 | Savarese | H04L 12/4633 |

OTHER PUBLICATIONS

"Isolation forest" Webpage <https://en.wikipedia.org/wiki/Isolation_forest> Wikipedia, Jul. 2, 2021. retrieved from Internet Archive Wayback Machine <https://web.archive.org/web/20210822050549/https://en.wikipedia.org/wiki/Isolation_forest> on Apr. 25, 2022.

* cited by examiner

*Primary Examiner* — Sakinah White Taylor

(57) ABSTRACT

Methods, systems, and techniques for facilitating identification of electronic data exfiltration. A message transmission log and screenshot metadata are obtained. A screenshot corresponding to the screenshot metadata is matched to a sent electronic message, such as an email, having a file attachment represented in the message transmission log to generate an event. The screenshot metadata indicates that the screenshot was captured prior to when the message transmission log indicates the electronic message was sent. An anomaly score is determined for the sent electronic message is determined by applying unsupervised machine learning, such as by applying an isolation forest, to score the sent electronic message relative to a baseline. The anomaly score meeting or exceeding an anomaly threshold is treated as potentially being indicative of electronic data exfiltration.

22 Claims, 8 Drawing Sheets

| Email From string E-mail address | Email To string E-mail address | Subject string Natural lang. | Attachment string Text | MessageSize string Text | Delivered string Boolean | TimeStamp string Date | Inbound string Boolean |
|---|---|---|---|---|---|---|---|
| user1@abc.com | recipient1@hotmail.com | RE: payment clarified | | 25147 bytes | true | Jan 1 15:05:45 | false |
| user2@abc.com | recipient2@outlook.com | Please call me | "image001.png" | 19675 bytes | true | Jan 1 10:04:49 | false |
| user3@abc.com | recipient3@hotmail.com | RE: [Scan] | | 35878 bytes | true | Jan 1 11:28:47 | false |
| user4@abc.com | recipient4@xyz.com | Open Report | | 2864 bytes | true | Jan 1 06:09:42 | false |
| user5@abc.com | recipient5@def.com | AM CALL RECAP, Webcast... | | 145032 bytes | true | Jan 1 08:57:49 | false |
| user6@abc.com | recipient6@III.com | RE: Ticker | "image003.jpg" | 10643374 bytes | true | Jan 1 09:35:45 | false |
| user7@abc.com | recipient7@gmail.com | RE: Regulatory Requirement | "winmail.dat" | 62301 bytes | true | Jan 1 14:25:22 | false |
| user8@abc.com | recipient8@def.com | Live Session | | 18335 bytes | true | Jan 1 17:04:12 | false |
| user9@abc.com | recipient9@hotmail.com | RE: Invoice Payment | | 28764 bytes | true | Jan 1 13:20:06 | false |
| user10@abc.com | recipient10@outlook.com | RE: XYZ. Ltd. | | 54485 bytes | true | Jan 1 15:09:00 | false |

FIG. 6

FIG. 7

METHOD AND SYSTEM FOR FACILITATING IDENTIFICATION OF ELECTRONIC DATA EXFILTRATION

TECHNICAL FIELD

The present disclosure is directed at methods, systems, and techniques for facilitating identification of electronic data exfiltration.

BACKGROUND

Electronic data exfiltration refers to the unauthorized transmission of an organization's data to one or more persons outside of that organization using an electronic device. For example, an employee of an organization may capture a screenshot of sensitive data and then transmit that screenshot outside of the organization via an electronic message, such as an email, by attaching the screenshot to the electronic message.

SUMMARY

According to a first aspect, there is provided a method comprising: obtaining message metadata and screenshot metadata; matching a screenshot corresponding to the screenshot metadata with an electronic message corresponding to the message metadata and having one or more file attachments to generate an event, wherein the screenshot metadata indicates that the screenshot was captured prior to when the message metadata indicates the electronic message was sent by a sender; determining an anomaly score for the event by applying unsupervised machine learning to score the event relative to a baseline; and determining that the anomaly score meets or exceeds an anomaly threshold.

The screenshot metadata and the message metadata may indicate that a user who captured the screenshot and the sender of the electronic message are identical.

The baseline may be based on one or both of prior message sending behavior of the sender of the electronic message and prior message sending behavior of persons other than the sender of the electronic message.

The electronic message may comprise an email, and the prior message sending behavior of persons other than the sender of the electronic message may be based on prior emails sent by the persons from addresses having a domain identical to a domain of an email address of the sender of the electronic message.

The anomaly score may be determined based on any one or more of an identity of a recipient of the electronic message; whether the sender of the electronic message sent the message to themselves; whether the sender of the electronic message sent the message to a competitor; a number of the file attachments; a number of screenshots taken a certain time period before the message was sent; a total size of the electronic message including the one or more file attachments; an average time difference between screenshot captures obtained a certain time period before the electronic message was sent; a time difference between when the electronic message was sent and when the screenshot was captured; and a security classification of data to which the sender of the electronic message has access.

The electronic message may comprise an email and determining the anomaly score may comprises: determining whether a domain of an email address of the recipient is on a list of known personal email domains; and determining that a string metric representative of similarity between a local-part of the email address of a recipient of the email and a name of the sender satisfies a name similarity threshold. The string metric may be determined by as the Jaro-Winkler distance.

Applying unsupervised machine learning may comprise using an isolation forest.

The method may further comprise, after determining that the anomaly score meets or exceeds the anomaly threshold, quarantining the message prior to the delivering the message.

The message may comprise an instant message sent using an instant messaging application.

Multiple screenshots may be captured prior to when the electronic message was sent, the screenshot used to generate the event may be one of the multiple screenshots, and of all the multiple screenshots the screenshot used to generate the event may have been captured most recently to when the electronic message was sent.

Multiple screenshots may be captured prior to when the electronic message was sent, the screenshot used to generate the event may be one of the multiple screenshots, and at least one of the multiple screenshots may have been captured more recently to when the electronic message was sent than the screenshot used to generate the event.

According to another aspect, there is provided a method comprising: obtaining message metadata corresponding to emails and screenshot metadata corresponding to screenshots, wherein the message metadata indicates for each of the emails whether the email comprises a file attachment and when the email was sent, and wherein the screenshot metadata indicates when each of the screenshots was captured; generating events wherein each of the events comprises one of the screenshots matched to one of the emails, and wherein for each of the events the screenshot of the event was captured before the email of the event was sent; determining an anomaly score for each of the events by applying an isolation forest to score each of the events relative to a baseline, wherein the score for each the events is based at least on the screenshot metadata and the message metadata for the event; and determining that the anomaly score for at least one of the events exceeds an anomaly threshold.

According to another aspect, there is provided a system comprising: at least one processor; and at least one memory communicatively coupled to the at least one processor, the at least one memory having stored thereon computer program code that is executable by the at least one processor and that, when executed by the at least one processor, causes the at least one processor to perform the method of any of the foregoing aspects or suitable combinations thereof.

According to another aspect, there is provided a non-transitory computer readable medium having stored thereon computer program code that is executable by at least one processor and that, when executed by the at least one processor, causes the at least one processor to perform the method of any of the foregoing aspects or suitable combinations thereof.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more example embodiments:

FIG. 6 depicts a message transmission log that comprises various sent emails that may be used for electronic data exfiltration, according to an example embodiment.

FIG. 7 depicts a matrix depicting how various metrics can affect an anomaly scores, according to an example embodiment.

DETAILED DESCRIPTION

Figure 1:
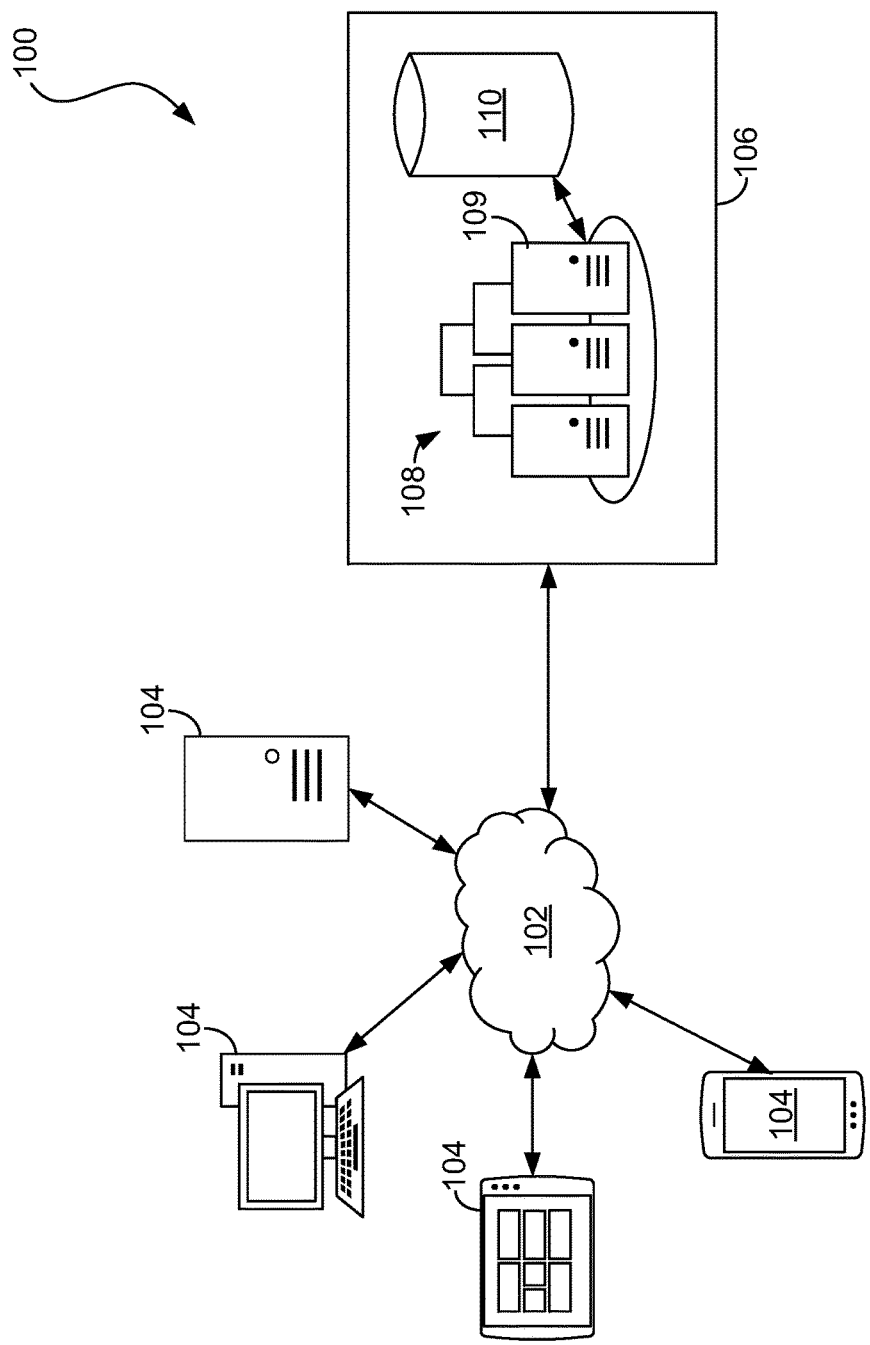
FIGS. 1, 3A, and 3B depict systems for facilitating identification of electronic data exfiltration, according to various example embodiments.

Electronic data exfiltration represents a material risk to organizations that have sensitive data to protect. An employee at such an organization may be able to access sensitive data through a computer program that lacks functionality conducive to certain forms of electronic data exfiltration, such as automatic sharing via email and printing. However, typically these programs do not prohibit using another program, such as screen capture software that may be built into or ship with a computer's operating system, to capture a screenshot of sensitive data that happens to be displayed on a screen. The employee can then export that screenshot outside of the organization by, for example, sending an email with that screenshot as an attachment to a recipient outside of the organization, and/or sending the screenshot using an instant messaging application such as the Slack™ or WhatsApp™ applications.

Conventional solutions to the problem of facilitating identification of electronic data exfiltration tends to focus on text based data loss prevention. For example, a server may scan the content of an email attachment and apply pattern managing to identify sensitive information in the form, for example, of social insurance and credit card numbers. However, these conventional solutions are computationally intensive, raise privacy and related data loss concerns, and also do not work if email attachments are encrypted.

In at least some embodiments herein, messages that have attachments are scored to determine the likelihood that respective screenshots that depict sensitive data have been attached to them. This is done without analyzing the content of the message attachment or screenshot in a computationally efficient manner by performing fuzzy joining to associate 1) sent messages with attachments with 2) screenshot events, which represent a screenshot captured at a particular time. Unsupervised machine learning is then used to score the messages to determine respective anomaly scores representing the likelihood that the sent messages had as attachments screenshots depicting sensitive data.

More particularly, metadata for messages ("message metadata") sent by a sender that have an attachment is obtained, and metadata pertaining to screenshots captured by the sender ("screenshot metadata") is also obtained. As discussed in further detail below, the message metadata may be obtained in the form of a message transmission log that stores a record of sent messages. The message metadata indicates when the sent messages were in fact sent by a sender, and the screenshot metadata includes a record of when the screenshot was captured by the sender. The content of the message attachment is not analyzed to determine whether it is identical to the screenshot, nor is the content depicted in the screenshot analyzed. Rather, various events each comprising a screenshot and a message sent after that screenshot are created, and those events are scored to determine an anomaly score relative to a baseline generated by the sender's past behavior and/or that of the sender's peers within the sender's organization. In at least some embodiments, the screenshot and the message are respectively captured by and sent by the same person. The scoring is performed using unsupervised machine learning for each of the events, and sent messages corresponding to events that have scores that meet or exceed an anomaly threshold are flagged as potentially being used to transmit sensitive data. Appropriate action, such as a detailed examination of those messages, can then be performed. While emails are discussed specifically below as example types of messages, more generally at least some other embodiments focus on different types of electronic messages (e.g., instant messages).

Referring now to FIG. 1, there is shown a system 100 for facilitating identification of electronic data exfiltration, according to an example embodiment. The system 100 comprises a data center 106, which itself comprises computational resources in the form of a server farm 108 comprising multiple servers 109 and storage resources in the form of a data lake 110. The server farm 108 and data lake 110 are communicatively coupled to each other. The data center 106 is communicatively coupled to a wide area network 102 such as the Internet. A number of different types of network endpoints 104 that communicate via the network 102 with the data center 106 are communicatively coupled to the network 102. While a server, personal computer, tablet, and phone are depicted as example endpoints 104 in FIG. 1, more generally any type of computing device suitable for network communication may be an endpoint 104. A person may accordingly log in to one of the endpoints 104 as, for example, a domain user in which the person's login credentials are stored on a domain controller comprising part of the data center 106. Following that login, that person may have access to sensitive data stored in the data center 106, such as in the data lake 110.

Figure 2:
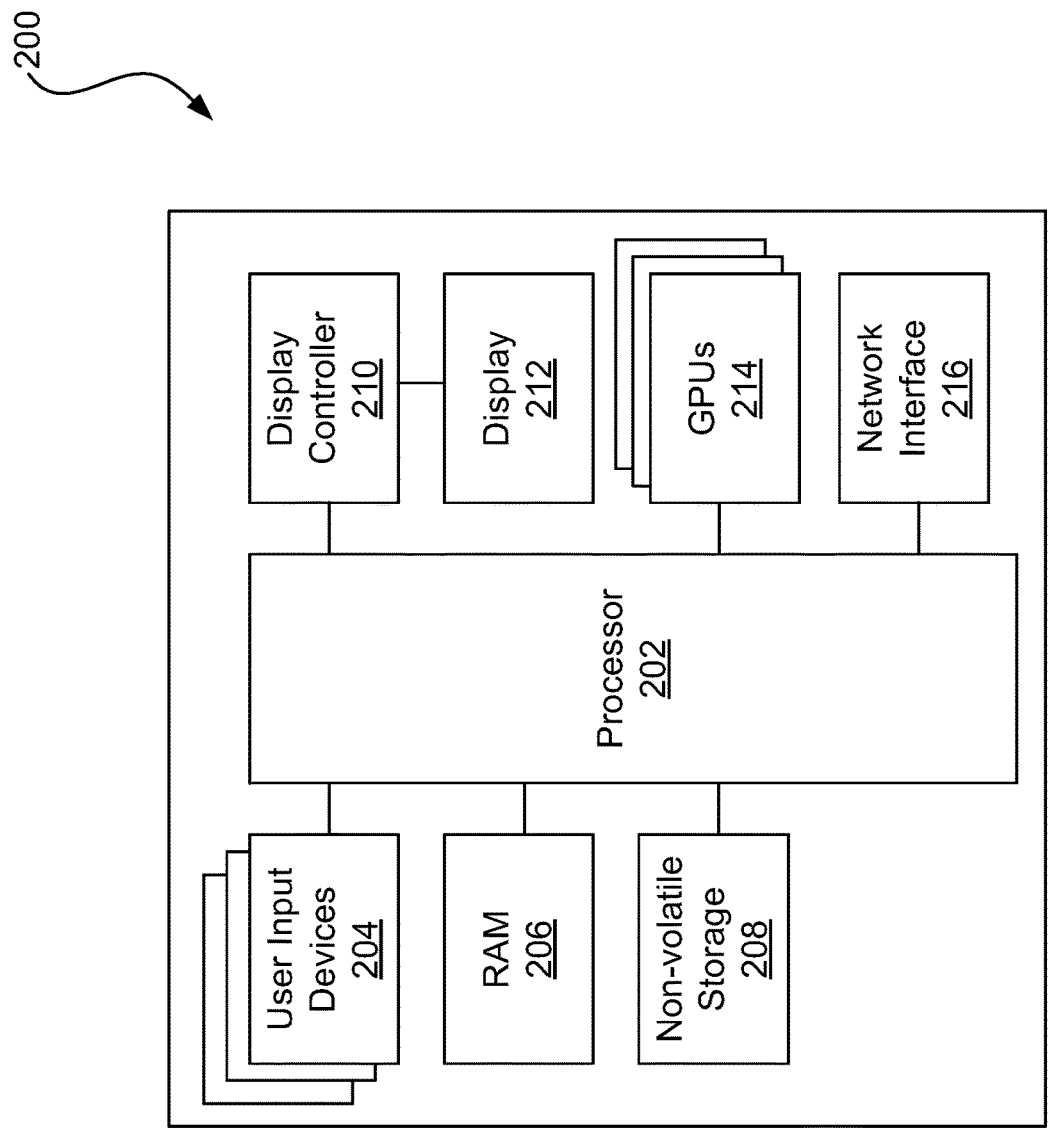
FIG. 2 depicts a computer comprising part of the system of FIG. 1.
Figure 4:
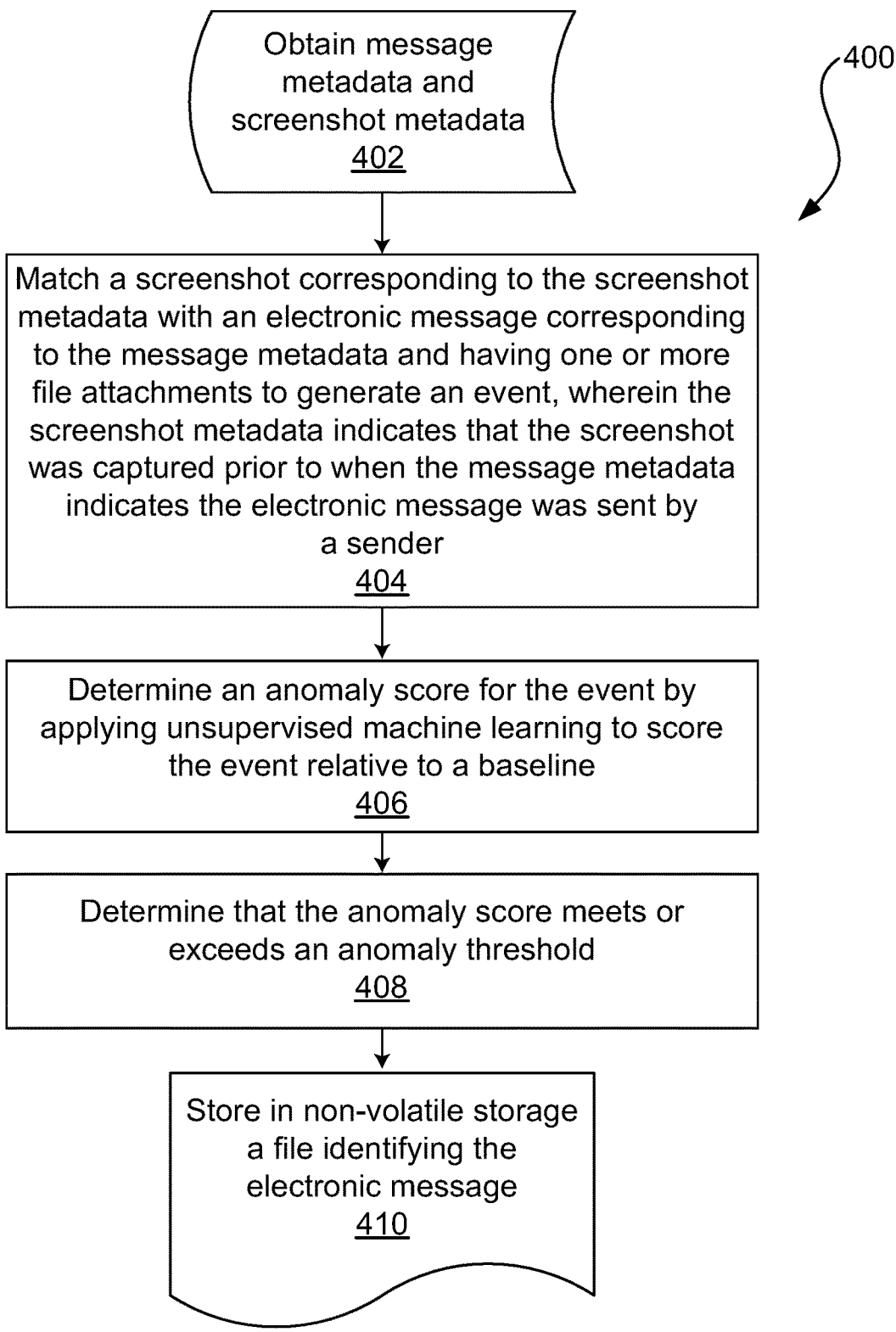
FIG. 4 depicts a method for facilitating identification of electronic data exfiltration, according to an example embodiment.

Referring now to FIG. 2, there is shown a block diagram of an example computer system 200 that may be used as any of the endpoints 104 or any of the servers 109 comprising part of the server farm 108. When used as one of the servers 109, the system 200 may be configured to perform a method for facilitating identification of electronic data exfiltration, such as that depicted in FIG. 4 and discussed further below.

The system 200 comprises a processor 202 that controls the system's 200 overall operation. The processor 202 is communicatively coupled to and controls subsystems comprising user input devices 204, which may comprise any one or more user input devices such as a keyboard, mouse, touch screen, and microphone; random access memory ("RAM") 206, which stores computer program code that is executed at runtime by the processor 202; non-volatile storage 208 (e.g., a solid state drive or magnetic spinning drive), which stores the computer program code loaded into the RAM 206 for execution at runtime and other data; a display controller 210, which may be communicatively coupled to and control a display 212; graphical processing units ("GPUs") 214, used for parallelized processing as is not uncommon in machine learning operations; and a network interface 216, which facilitates network communications with the network 102 and, when the system 200 acts as one of the servers 109, with the other servers 109 in the server farm 108. Any one or more of the methods for facilitating identification of electronic data exfiltration as described herein or portions thereof may be implemented as computer program code and stored in the non-volatile storage 208 for loading into the RAM 206 and execution by the processor 202, thereby causing the system 200 to perform those methods.

Figure 3A:
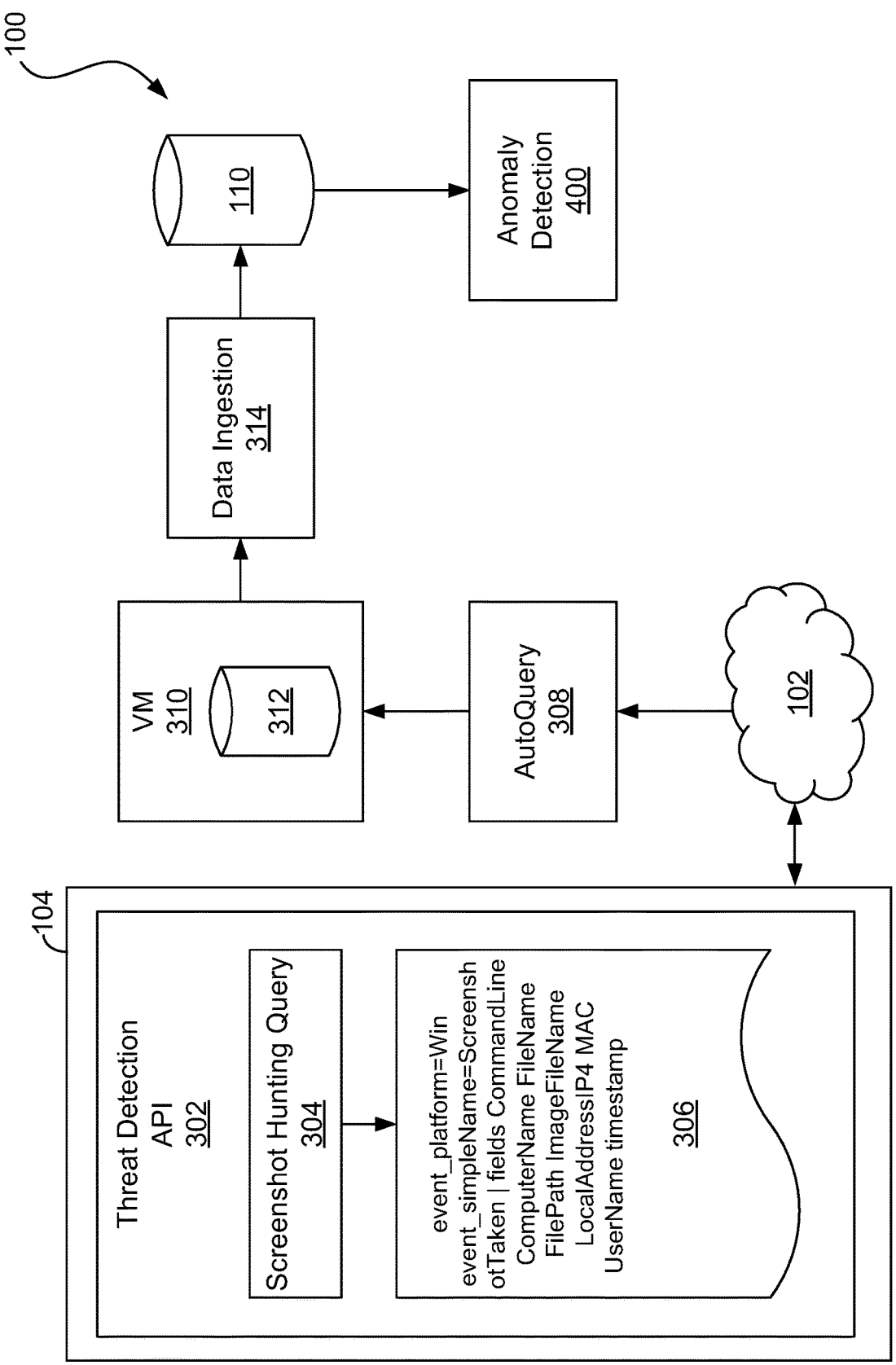
Figure 3B:
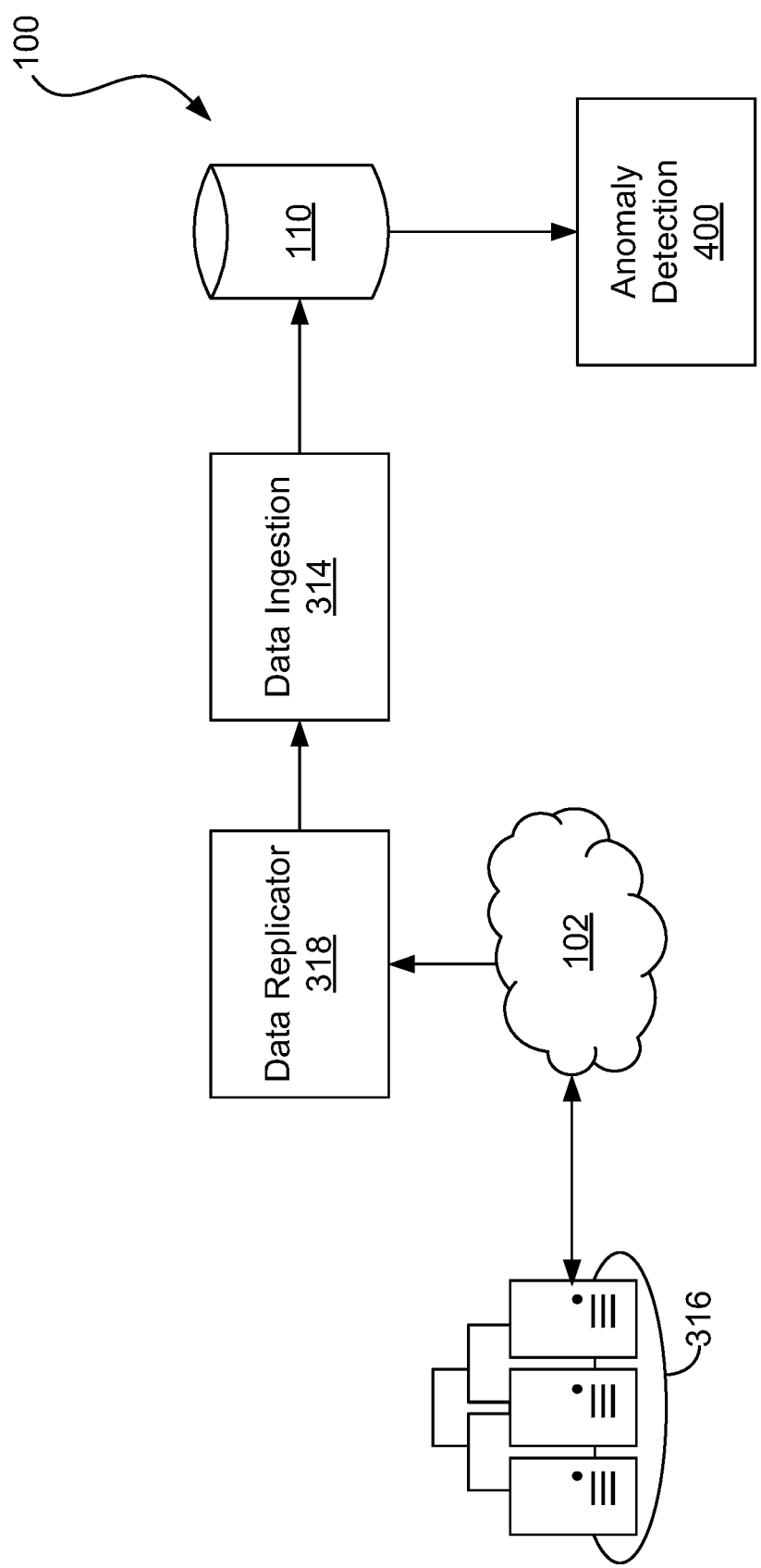

Referring now to FIGS. 3A and 3B, there are depicted additional example embodiments of the system 100 for facilitating identification of electronic data exfiltration. More particularly, FIGS. 3A and 3B represent different ways in which the data center 106 may collect screenshot metadata for processing.

In FIG. 3A, each of the endpoints 104 has running on it endpoint detection and response ("EDR") software, such as from CrowdStrike Holdings, Inc. The EDR software is stored as computer program code on the non-volatile storage 208 and is loaded into RAM 206 at runtime, where it is executed by the processor 202 to cause each of the endpoints 104 to perform the following functionality. The EDR software comprises a threat detection application programming interface ("API") 302 that, when executed, periodically executes a screenshot hunting query 304 that detects screenshots events that occur on the endpoint 104. Upon detecting a screenshot event, the EDR software outputs a file 306 comprising the screenshot metadata. More generally, screenshot detection may be performed on the Windows™ operating system at the kernel level using Event Tracing for Windows™ (ETW). As shown in FIG. 3A, the screenshot metadata identifies the platform the screenshot event occurred on (event platform); a name of the screenshot event (event simpleName); a file system (e.g. Windows™ directory) path of the application from which the screenshot was taken and/or the application that is the subject of the screenshot (CommandLine); the name of the endpoint 104 on which the screenshot event occurred (ComputerName); the file name assigned to the file 306 (FileName); the path identifying where in the file system the screenshot is stored (FilePath); the file name assigned to the screenshot that was captured (ImageFileName); the IP address of the endpoint 104 on which the screenshot event occurred (LocalAddressIP4); the MAC address of the endpoint 104 on which the screenshot event occurred (MAC); the name of the user, which may be expressed as a domain name, who was logged on the endpoint 104 when the screenshot event occurred (UserName); and the time at which the screenshot event occurred (timestamp).

The endpoint 104 exports the file 306 comprising the screenshot metadata to the data center 106 via the network 102. In FIG. 3A, the data center 106 is represented by an AutoQuery process 308, a virtual machine 310, a data ingestion process 314, an anomaly detection method 400, and the data lake 110. The AutoQuery process 308 retrieves the files 306 from the endpoints 104 from time to time and sends the files 306 to the virtual machine 310, which hosts a database 312 that stores the files 306. The data ingestion process 314 ingests the files 306 from the database 312 and transfers relevant screenshot metadata to the data lake 110. The data lake 110 also stores the message transmission logs for the emails sent by users on the endpoints 104 by virtue of the email server comprising one of the servers 109 of the server farm 108. The anomaly detection method 400 accesses the files 306 and message transmission logs from the data lake 110 and processes them to facilitate identification of electronic data exfiltration, as described in further detail below in respect of FIG. 4. An example message transmission log for organization ABC Corp. containing message metadata is provided in FIG. 6. The log is for ten emails respectively sent from user1@abc.com through user10@abc.com, with abc.com being the domain of ABC Corp., to recipients having local-parts recipient1 through recipient10 at various domains. For each email, the log shows the sender's email address, the recipient's email address, the email's subject, the email's size in bytes (including the size of any attachment), whether the email was successfully delivered, a timestamp of when the email was delivered, and whether the email was an inbound email (i.e., whether an outside organization was sending the email to ABC Corp.). While all the emails shown in the log of FIG. 6 are outbound emails and hence the "Inbound" flag for each is set to "false", in at least some other embodiments the log may contain one or more inbound emails as well. The log reflects in particular that emails from user2, user6, and user7 respectively had attachments image001.png, image003.jpg, and winmail.dat.

The "Delivered" column in the message transmission log of FIG. 6 indicates in this example that all the sent emails were in fact successfully delivered to their recipients. In at least some other embodiments, an email or other type of message may be "sent" by the sender without having yet been delivered to the recipient. For example, the sender may push the "send" button on an email to instruct one of the servers 109 to deliver the email, but the server 109 may delay actually delivering the email for a certain period of time. This delay period gives the sender an opportunity to retract a sent email, and may also give the server 109 an opportunity to determine whether the sent email may be being used for data exfiltration by applying, for example, the anomaly detection method 400 prior to delivering the email. If the anomaly detection method 400 identifies the sent email as being used for data exfiltration, the server 109 may quarantine that email and prevent it from being delivered until it can be further investigated. In this manner, an attempt at data exfiltration can be identified and thwarted.

In FIG. 3B, each of the endpoints 104 again runs EDR software that logs screenshot events. However, instead of the resulting screenshot metadata being stored as files 306 that are periodically retrieved by the AutoQuery process 308 as in FIG. 3A, the files 306 with the screenshot metadata are stored in cloud storage 316, such as Amazon S3™ storage. A data replicator process 318 is used to replicate the files 306 stored in the cloud storage 316 from time to time; the data replicator process 318 may comprise, for example, the CrowdStrike Falcon Data Replicator™ from CrowdStrike Holdings, Inc. Once the files 306 are replicated, they are ingested by the data ingestion process 314 and copied to the data lake 110 in a manner analogous to that of FIG. 3A. The anomaly detection method 400 is then able to retrieve the message transmission logs and screenshot metadata from the data lake 110 and perform the method 400 of FIG. 4, as described below.

The method 400 as described below is performed by one of the servers 109 in the server farm 108. In at least some different embodiments (not depicted), the method 400 may be performed in a distributed fashion by multiple servers 109 and/or other computing devices, such as the endpoints 104.

The server 109 at block 402 obtains the message metadata and screenshot metadata for at least one of the endpoints 104, as described above in respect of FIGS. 3A and 3B. In the presently described embodiment, the message transmission log comprises the message metadata and the message is an email, although in at least some other embodiments the message metadata and message may take different forms, as discussed above. The message transmission log comprises times respective emails are sent and which of the emails has a file attachment, and the screenshot metadata comprises respective times screenshots are captured. In at least some embodiments in which emails and screenshots for multiple users are being processed concurrently, the message metadata may further comprise the identities of the senders of the emails, and the screenshot metadata may further comprise the identities of the users who captured the screenshots.

The server 109 then, at block 404, matches a screenshot corresponding to the screenshot metadata with an electronic message, which in the presently described embodiment is a sent email, corresponding to the message metadata. As the screenshot metadata indicates when the screenshot was captured and the message metadata indicates when the message was sent and whether it has a file attachment, the server 109 matches screenshots to emails with at least one file attachment sent after the screenshot was captured. In at least some embodiments in which the server 109 is processing messages and emails from multiple users concurrently, the server 109 may further use user identity information in the screenshot and message metadata to only match screenshots and emails that were respectively captured and sent by the same individual. The resulting screenshot and message pair collective comprise an "event for" which the server 109 determines an anomaly score by applying unsupervised machine learning as discussed further below. As mentioned above, the server 109 does not analyze the content of the file attached to the sent email nor of the screenshots captured on the endpoint 104; rather, the server 109 uses the screenshot and message metadata to match particular screenshots to particular emails.

For example, for times $t_1<t_2<t_3<t_4<t_5$ for any given 24 hour period, presume the message transmission log shows emails having attachments were sent at times $t_1$, $t_3$, and $t_5$ and the screenshot metadata shows screenshots were captured at times $t_2$ and $t_4$. In this example, the server 109 matches the email sent at time $t_3$ with the screenshot taken at time $t_2$, and the email sent at time $t_5$ with the screenshots taken at times $t_2$ and $t_4$. In at least some other example embodiments, the server 109 may match an email only with the screenshot most recently captured prior to the email; applying that methodology to the email sent at time $t_5$ and the screenshots taken at times $t_2$ and $t_4$ would result in the server 109 matching the email sent at time $t_5$ with only the screenshot taken at time $t_4$.

As scoring is performed in respect of any particular sent email with an attachment and any particular screenshot, the server 109 may process the same email or screenshot multiple times in connection with the different events that email or screenshot is associated with. In the above example in which emails having attachments were sent at $t_1$, $t_3$, and $t_5$ and screenshots were taken at times $t_2$ and $t_4$, the server 109 would accordingly process three events: one based on the combination of the email at time $t_3$ and the screenshot at time $t_2$; a second based on the combination of the email at time $t_5$ with the screenshot at time $t_2$; and a third based on the combination of the email at time $t_5$ with the screenshot at time $t_4$.

As another example, in a given day for two screenshots respectively captured at times $t_1$ and $t_2$ and two emails respectively sent at times $t_3$ and $t_4$ with $t_1<t_2<t_3<t_4$, the server 109 would process four events: a first event in which the email at time $t_3$ is matched with the screenshot at time $t_1$; a second event in which the email at time $t_3$ is matched with the screenshot at time $t_2$; a third event in which the email at time $t_4$ is matched with the screenshot at time $t_1$; and a fourth event in which the email at time $t_4$ is matched with the screenshot at time $t_2$. As mentioned above, in at least some other example embodiments the server 109 may match an email only with the screenshot most recently captured prior to the email; applying that methodology to this example in which screenshots are captured at times $t_1$ and $t_2$ and emails are sent at times $t_3$ and $t_4$ would result in the server 109 processing only two events: a first event in which the email at time $t_3$ is matched with the screenshot at time $t_2$ and a second event in which the email at time $t_4$ is matched with the screenshot at time $t_2$.

In at least some embodiments, screenshots are matched to messages only if the screenshots were captured within a certain window of time prior to when the email was sent. For example, the server 109 may only match a screenshot to a message to generate an event if the message was sent within 24 hours of the screenshot being captured.

After an event is generated at block 406, the server 109 determines an anomaly score for the event by applying unsupervised machine learning to score the event relative to a baseline. More particularly, the server 109 determines the baseline relative to prior behavior of the sender of the email, prior behavior of the sender's peers within the sender's organization, or a combination of both. For example, in an embodiment in which the unsupervised machine learning model used comprises an isolation forest model, both the prior behavior of the sender of the email and the prior behavior of the sender's peers within the sender's organization may be given as features in the isolation forest model. When the electronic message is email, the server 109 may use as a proxy for the sender's peers the behavior of persons who have sent emails from a domain identical to a domain of the sender's email address on the basis that the identical domains represent the same organization.

In respect of any particular sent email with an attachment and any particular screenshot, the server 109 considers the following metrics when assessing the baseline:
1 SC_count_before_email: a number of screenshots taken a time period (e.g., 24 hours) before the sent email was sent.
2. TimeDiff: a time difference (e.g., in minutes) between timestamps evidencing when the sent email was sent and when the screenshot was captured.
3. Avg_delta_between_SC: an average time (e.g., in minutes) between successive screenshots within a time period (e.g., 24 hours) before the sent email was sent.
4. Attachment_Count: a number of attachments attached to the sent email.
5. MessageSize: a size (e.g., in bytes), including that of the one or more attachments to the sent email, of the sent email.
6. Sending_To_Themselves: a binary flag indicating whether the recipient of the sent email was themselves. The server 109 scans recipient's email address to identify text strings corresponding to the sender's personal email account. For example, the server 109 may scan the recipient email address's domain to determine whether a domain of an email address of the recipient is on a list of known personal email domains (e.g., gmail.com for Gmail™) and that a string metric representative of similarity between a local-part of the email address of the recipient and a name of the sender satisfies a name similarity threshold (e.g., whether the sender's first or last name is present in the recipient email address's username, or whether the Jaro-Winkler distance between the local-part of the recipient's email address and the sender's name is sufficiently small).

7. Recipient_isCompetitor: a binary flag that indicates whether the recipient of the sent email is a competitor of the sender's organization. The server 109 scans the domain of the recipient's email address to identify text strings corresponding to competitor email domains.
8. BusinessCriticality_critical: a binary flag that indicates whether the sender has access to a business group that is classified as "critical" to the sender's organization.
9. BusinessCriticality_High: a binary flag that indicates whether the sender has access to a business group that is classified as "high" to the sender's organization.
10. CrownJewel_Access: a binary flag that indicates whether the sender has access to applications that are critical to the sender's organization's goals. A cybersecurity breach in respect of one of these applications would likely result in material reputational, regulatory, legal, and/or financial harm to the sender's organization.
11. DataClassification_confidential: a binary flag that indicates whether the sender has access to data classified as "confidential" to the sender's organization.
12. DataClassification_Sensitive: a binary flag that indicates whether the sender has access to data classified as "sensitive" to the sender's organization.

In at least some embodiments, the server 109 determines the baseline for each of the above metrics as an average and standard deviation of that metric over a period of time. For example, in at least some embodiments the server 109 determines the average and standard deviation over an expanding window that starts at a certain time in the past and expands to include new data as it arrives. The expanding window may expand to a certain duration (e.g., 3 months), following which the server 109 determines the average and standard deviation as a moving average over that duration that is updated from time to time. The baseline for any one or more of the metrics may be differently determined in different embodiments; for example, the baseline for any one of more of the metrics may alternatively be manually entered by a user.

When determining the baseline relative to the sender's own prior behavior, the BusinessCriticality_critical, BusinessCriticality_High, CrownJewel_Access, DataClassification_confidential, and DataClassification_Sensitive metrics generally do not vary between the sender's baseline and the sender's observed behavior in respect of any particular sent email. The SC_count_before_email, TimeDiff, Avg_delta_between_SC, Attachment_Count, MessageSize, Sending_To_Themselves, and Recipient_isCompetitor flags may deviate, and for each metric the server 109 determines the deviation with respect to the baseline when determining the anomaly score. In at least some embodiments, the server 109 determines the number of standard deviations the sender deviates from the baseline. The server 109 uses this deviation to determine the anomaly score. For the TimeDiff and Avg_delta_between_SC metrics, a negative deviation corresponds to a higher anomaly score; for SC_count_before_email, Attachment_Count, MessageSize, Sending_To_Themselves, and Recipient_isCompetitor metrics, a positive deviation corresponds to a higher anomaly score. For example, a sent email with more attachments than average that is sent nearer to a screenshot event than average would correspond to a higher anomaly score. As mentioned above, in at least some examples an isolation forest machine learning model is used to determine an anomaly score. In contrast to competing outlier detection methods, the isolation forest identifies anomalies instead of profiling normal data points. Since an isolation forest comprises an ensemble of many trees, in each of those trees a feature is first selected randomly followed by choosing a random split value between the minimum and maximum values of the selected feature to create a partition. The number of partitions to identify non-anomalous events is more than the number of partitions for identifying an anomalous event. An email scored in this manner with a score above a certain anomaly threshold, such as 0.5 or 0.6, is determined to be anomalous.

When determining the anomaly score relative to a baseline determined based on the sender's peers, the baseline may be analogously determined relative to any suitable peer group. For example, the peer group considered may be any one or more of Transit, Business Unit Functional Unit and Geographical Unit ("BUFUGU"), and line of business ("LOB"), peers with identical job titles, and peers with identical access to certain of the organizations applications or with identical security clearances. In this example, Transit is a subset of BUFUGU, which itself is a subset of LOB. More generally, Transit may be replaced with any suitable designation of geographic region and BUFUGU may be replaced with any suitable designation of business unit and/or geographical unit. Additionally or alternative, a series of baselines in which each of the $2^{nd}$ and subsequent baselines is a subset of the prior baseline may be used in respect of the same metric.

The server 109 applies an isolation forest to process these metrics and to output an anomaly score relative to the sender's own baseline and/or a baseline determined with one or more of the sender's own peer groups. The isolation forest's hyperparameters comprise the number of trees in the forest (e.g., 100) and contamination, which is the expected proportion of anomalies in the data (e.g., 0.05). Table 1, below, summarizes which metrics above are used when determining the anomaly score relative to the sender's own baseline, and relative to the baseline determined from the sender's peer groups.

TABLE 1

Summary of Features Used in Isolation Forest for Anomaly Detection

| Metric | Sender's Own Baseline | Peer Group Baseline | | |
|---|---|---|---|---|
| | | Transit | BUFUGU | LOB |
| SC_count_before_email | Used | Used | Used | Not Used |
| TimeDiff | Used | Not Used | Not Used | Not Used |
| Avg_delta_between_SC | Used | Not Used | Not Used | Not Used |
| Attachment_Count | Used | Used | Used | Used |
| MessageSize | Used | Not Used | Not Used | Not Used |
| Sending_To_Themselves | Used | Used | Used | Used |
| Recipient_isCompetitor | Used | Used | Used | Not Used |

The anomaly score that the server 109 determines at block 406 is in at least some embodiments a score between 0 and 1, with a higher score correlating a more anomalous reading. At block 408, the server 109 compares the anomaly score for the sent message with an anomaly score threshold to determine whether the determined score meets or exceeds the threshold. For example, when the range of possible anomaly scores is between 0 and 1 and higher scores are more anomalous, the anomaly score threshold may be 0.75, with sent emails with anomaly scores of at least 0.75 being deemed to be used to exfiltrate data. The server 109 at block 410 stores in the non-volatile storage 208 a file identifying the sent email. This file may subsequently be used as a basis for more detailed investigation of the sent message, such as manual inspection by a data inspection team.

Figure 5:
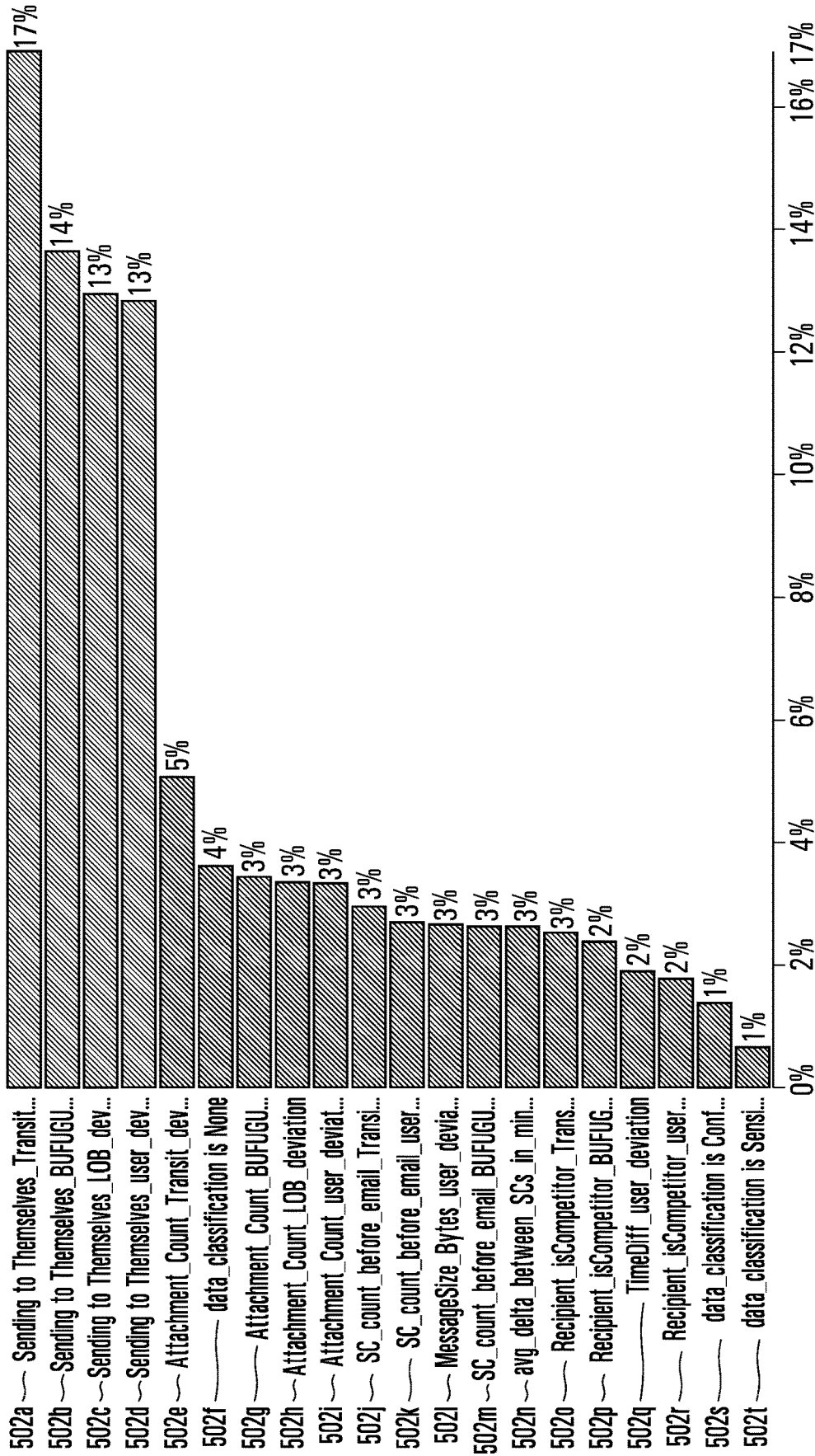
FIG. 5 depicts a graph showing relative importance of various metrics when identifying electronic data exfiltration, according to an example embodiment.

FIG. 5 shows a graph depicting relative importance of various metrics 502a-t as determined relative to certain baselines in respect of email when identifying electronic data exfiltration, according to an example embodiment. In FIG. 5, metrics 502a-d are examples of Sending_To_Themselves and identify whether the sender is sending the email to themselves relative to a baseline determined in respect of other users with the same Transit (502a), BUFUGU (502b), and LOB (502c), and relative to the sender's own past behavior (502d). Metrics 502e,g-i are examples of Attachment_Count and identify the number of attachments to the email relative to a baseline determined in respect of other users with the same Transit (502e), BUFUGU (502g), LOB (502h), and relative to the sender's own past behavior (502i). Metric 502s is an example of DataClassification_confidential, metric 502t is an example of DataClassification_Sensitive, and metric 502f is for data that does not have a classification (502f). Metrics 502j,k,m are examples of SC_count_before_email and identify the number of screenshots captured by the sender before sending the email relative to a baseline determined in respect of other users with the same Transit (502j), the sender's own past behavior (502k), and other users with the same BUFUGU (502m). Metric 502l is an example of MessageSize relative to a baseline determined in respect of the sender's own past behavior. Metric 502n is an example of Avg_delta_between_SC over the past 24 hours relative to a baseline determined in respect of the sender's own behavior. Metrics 502o,p,r are examples of Recipient_isCompetitor relative to a baseline determined in respect of other users with the same Transit (502o), BUFUGU (502p), and the sender's own past behavior (502r). Metric 502q is an example of TimeDiff relative to a baseline determined in respect of the user's own past behavior.

Figure 7:
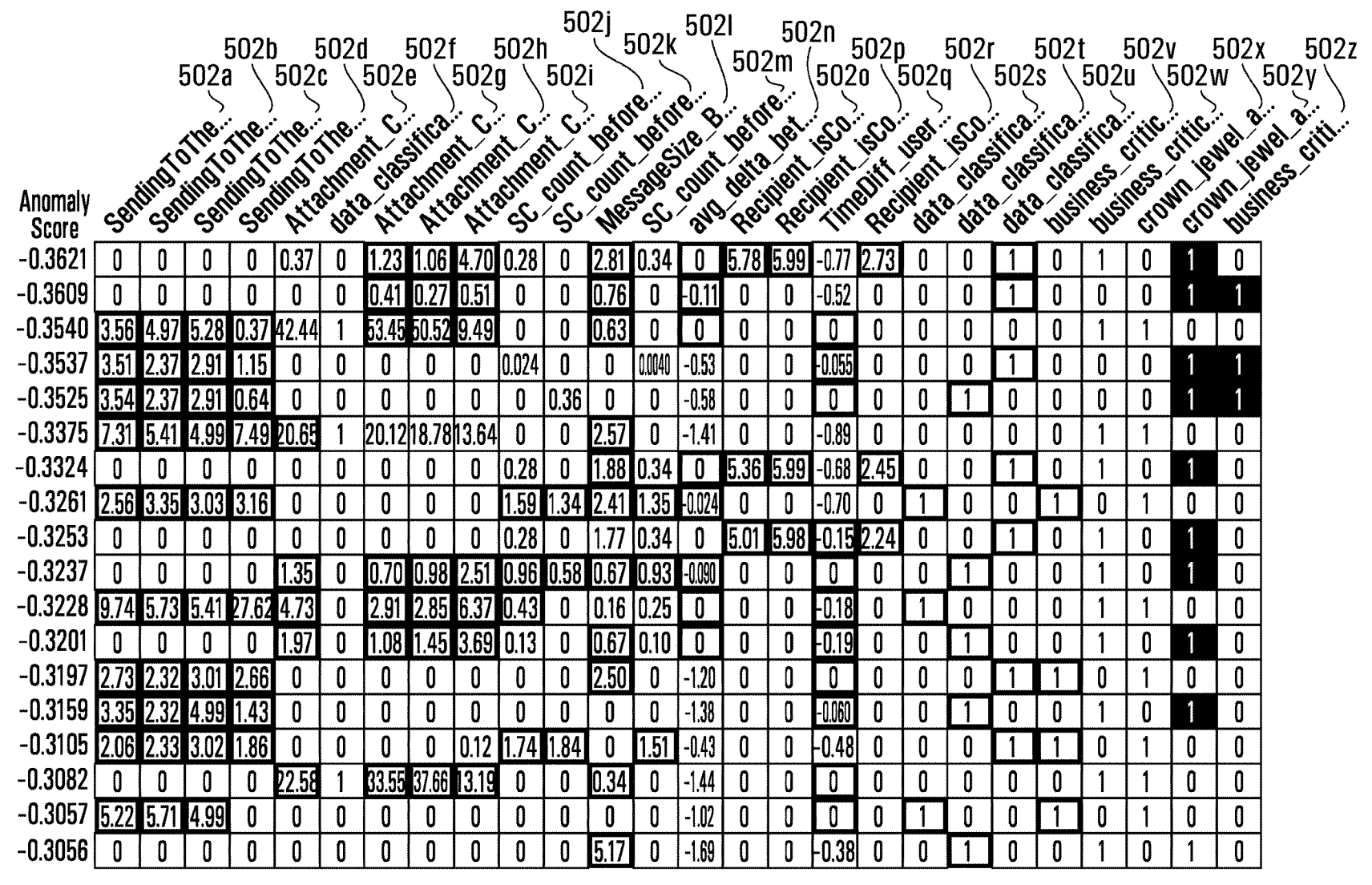

FIG. 7 depicts a matrix depicting how various metrics can affect an anomaly scores, according to an example embodiment. Metrics 502a-t from FIG. 6 are depicted, as well as metrics 502u-z, with each column having its own metric 502a-z. Metric 502u is an example of DataClassification_confidential or DataClassification_Sensitive; metrics 502v,w,z are examples of BusinessCriticality_critical and/or BusinessCriticality_High; and 502x,y are examples of CrownJewel_Access. Each row corresponds to a different event having a different anomaly score, and the matrix indicates the contribution of each metric to the event's anomaly score. Contributions whose cells are emphasized in black contribute relatively more to the anomaly score than other metrics.

Experimental Results

In experimental testing, the method 400 was run 13 times over 3 months on email senders employed by a particular organization. After each run, the file generated at block 410 was sent to a data protection team who manually classified the sent emails identified in the file into the following categories:

1 Malicious insider: the sender intentionally used email to exfiltrate data from the organization without authorization.
2. Lack of user awareness: the sender used email to exfiltrate data from the organization without authorization, but did not do so maliciously (e.g., the sender sent data to their personal email address in order to make it easier to work from home).
3. Sender error: The sender exfiltrated data through inadvertent error (e.g., data was sent to the sender's personal account through clerical error).
4. False positive: The sent email was not an attempt at electronic data exfiltration.

The method 400 was tested as follows:

1. Total number of events analyzed: 5,395,002. In this example, each "event" comprises a particular combination of a sent email having an attachment, as determined from an message transmission log; and a particular attachment, as determined from the screenshot metadata. This example used only the screenshot captured most recently before when the sent email was sent to generate the event. For example, if the screenshot metadata shows two screenshots respectively captured at times $t_1$ and $t_2$, and the message transmission log shows an email having an attachment sent at time $t_3$ where $t_1 < t_2 < t_3$, only a single event corresponding to the matching of the email with the screenshot captured at time $t_2$ would be analyzed.
2. Total number of sent emails that met or exceeded the anomaly threshold and that were passed on to the data protection team: 16,428. An anomaly threshold of 0.6 was used.
3. Total number of incidents that were of interest to the data protection: 55.
4. Total number of unique senders analyzed by the method 400: 75,256.
5. Total number of unique senders flagged by the method 400 for sending potentially anomalous emails: 7,907.

On a weekly basis, approximately 425,000 events were scored (i.e., events captured in one week), out of which approximately 1,400 events were flagged as being anomalous and were sent to the data protection team for investigation. In terms of number of unique users analyzed, approximately 850 users out of approximately 40,000 users were flagged as anomalous. The method 400 accordingly permitted culling of 5,395,002 events down to 16,428 for investigation by the data protection team, representing an automated culling of 99.7% of events.

Table 2 summarizes the events that resulted in an investigation.

TABLE 2

Summary of anomalous events investigated by the data protection team

| Category | Number of Events | Number of unique user(s) |
|---|---|---|
| Malicious Insider | 3 | 1 |
| Lack of user awareness | 38 | 24 |
| Sender error | 8 | 4 |
| False positive | 6 | 3 |
| Total | 55 | 32 |

Of the 55 events identified in accordance with an example embodiment of the method, following investigation by the data protection team 49 represented malicious or inadvertent electronic data exfiltration and 6 were false positives.

The processor used in the foregoing embodiments may comprise, for example, a processing unit (such as a processor, microprocessor, or programmable logic controller) or a microcontroller (which comprises both a processing unit and a non-transitory computer readable medium). Examples of computer readable media that are non-transitory include disc-based media such as CD-ROMs and DVDs, magnetic media such as hard drives and other forms of magnetic disk storage, semiconductor based media such as flash media, random access memory (including DRAM and SRAM), and read only memory. As an alternative to an implementation that relies on processor-executed computer program code, a hardware-based implementation may be used. For example, an application-specific integrated circuit (ASIC), AI accelerator, field programmable gate array (FPGA), system-on-a-chip (SoC), or other suitable type of hardware implementation may be used as an alternative to or to supplement an implementation that relies primarily on a processor executing computer program code stored on a computer medium.

The embodiments have been described above with reference to flow, sequence, and block diagrams of methods, apparatuses, systems, and computer program products. In this regard, the depicted flow, sequence, and block diagrams illustrate the architecture, functionality, and operation of implementations of various embodiments. For instance, each block of the flow and block diagrams and operation in the sequence diagrams may represent a module, segment, or portion of code, which comprises one or more executable instructions for implementing the specified action(s). In some alternative embodiments, the action(s) noted in that block or operation may occur out of the order noted in those figures. For example, two blocks or operations shown in succession may, in some embodiments, be executed substantially concurrently, or the blocks or operations may sometimes be executed in the reverse order, depending upon the functionality involved. Some specific examples of the foregoing have been noted above but those noted examples are not necessarily the only examples. Each block of the flow and block diagrams and operation of the sequence diagrams, and combinations of those blocks and operations, may be implemented by special purpose hardware-based systems that perform the specified functions or acts, or combinations of special purpose hardware and computer instructions.

The terminology used herein is for the purpose of describing particular embodiments only and is not intended to be limiting. Accordingly, as used herein, the singular forms "a", "an", and "the" are intended to include the plural forms as well, unless the context clearly indicates otherwise (e.g., a reference in the claims to "a challenge" or "the challenge" does not exclude embodiments in which multiple challenges are used). It will be further understood that the terms "comprises" and "comprising", when used in this specification, specify the presence of one or more stated features, integers, steps, operations, elements, and components, but do not preclude the presence or addition of one or more other features, integers, steps, operations, elements, components, and groups. Directional terms such as "top", "bottom", "upwards", "downwards", "vertically", and "laterally" are used in the following description for the purpose of providing relative reference only, and are not intended to suggest any limitations on how any article is to be positioned during use, or to be mounted in an assembly or relative to an environment. Additionally, the term "connect" and variants of it such as "connected", "connects", and "connecting" as used in this description are intended to include indirect and direct connections unless otherwise indicated. For example, if a first device is connected to a second device, that coupling may be through a direct connection or through an indirect connection via other devices and connections. Similarly, if the first device is communicatively connected to the second device, communication may be through a direct connection or through an indirect connection via other devices and connections. The term "and/or" as used herein in conjunction with a list means any one or more items from that list. For example, "A, B, and/or C" means "any one or more of A, B, and C".

It is contemplated that any part of any aspect or embodiment discussed in this specification can be implemented or combined with any part of any other aspect or embodiment discussed in this specification.

The scope of the claims should not be limited by the embodiments set forth in the above examples, but should be given the broadest interpretation consistent with the description as a whole.

It should be recognized that features and aspects of the various examples provided above can be combined into further examples that also fall within the scope of the present disclosure. In addition, the figures are not to scale and may have size and shape exaggerated for illustrative purposes.

The invention claimed is:

1. A method comprising:
(a) obtaining message metadata and screenshot metadata;
(b) matching a screenshot corresponding to the screenshot metadata with an electronic message corresponding to the message metadata and having one or more file attachments to generate an event, wherein the screenshot metadata indicates that the screenshot was captured prior to when the message metadata indicates the electronic message was sent by a sender;
(c) determining an anomaly score for the event by applying unsupervised machine learning to score the event relative to a baseline; and
(d) determining that the anomaly score meets or exceeds an anomaly threshold,
wherein multiple screenshots are captured prior to when the electronic message was sent, and the screenshot used to generate the event is one of the multiple screenshots, and
wherein:
of all the multiple screenshots, the screenshot used to generate the event was captured most recently to when the electronic message was sent, or
at least one of the multiple screenshots was captured more recently to when the electronic message was sent than the screenshot used to generate the event.

2. The method of claim 1, wherein the screenshot metadata and the message metadata indicate that a user who captured the screenshot and the sender of the electronic message are identical.

3. The method of claim 1, wherein the baseline is based on prior message sending behavior of the sender of the electronic message.

4. The method of claim 1, wherein the baseline is based on prior message sending behavior of persons other than the sender of the electronic message.

5. The method of claim 4, wherein the electronic message comprises an email, and wherein the prior message sending behavior of persons other than the sender of the electronic message is based on prior emails sent by the persons from addresses having a domain identical to a domain of an email address of the sender of the electronic message.

6. The method of claim 1, wherein the anomaly score is determined based on an identity of a recipient of the electronic message.

7. The method of claim 6, wherein the anomaly score is determined based on whether the sender of the electronic message sent the message to themselves.

8. The method of claim 7, wherein the electronic message comprises an email and wherein determining the anomaly score comprises:
(a) determining whether a domain of an email address of the recipient is on a list of known personal email domains; and (b) determining that a string metric representative of similarity between a local-part of the email address of a recipient of the email and a name of the sender satisfies a name similarity threshold.

9. The method of claim 6, wherein the anomaly score is determined based on whether the sender of the electronic message sent the message to a competitor.

10. The method of claim 1, wherein the anomaly score is determined based on a number of the file attachments.

11. The method of claim 1, wherein the anomaly score is determined based on a number of screenshots taken a certain time period before the message was sent.

12. The method of claim 1, wherein the anomaly score is determined based on a total size of the message including the one or more file attachments.

13. The method of claim 1, wherein the anomaly score is determined based on an average time difference between screenshot captures obtained a certain time period before the electronic message was sent.

14. The method of claim 1, wherein the anomaly score is determined based on a time difference between when the electronic message was sent and when the screenshot was captured.

15. The method of claim 1, wherein the anomaly score is determined based on a security classification of data to which the sender of the electronic message has access.

16. The method of claim 1, wherein applying unsupervised machine learning comprises using an isolation forest.

17. The method of claim 1, further comprising, after determining that the anomaly score meets or exceeds the anomaly threshold, quarantining the message prior to the delivering the message.

18. The method of claim 1, wherein the message comprises an instant message sent using an instant messaging application.

19. The method of claim 1, wherein of all the multiple screenshots the screenshot used to generate the event was captured most recently to when the electronic message was sent.

20. The method of claim 1, wherein at least one of the multiple screenshots was captured more recently to when the electronic message was sent than the screenshot used to generate the event.

21. A method comprising:
   (a) obtaining message metadata corresponding to emails and screenshot metadata corresponding to screenshots, wherein the message metadata indicates for each of the emails whether the email comprises a file attachment and when the email was sent, and wherein the screenshot metadata indicates when each of the screenshots was captured;
   (b) generating events wherein each of the events comprises one of the screenshots matched to one of the emails, and wherein for each of the events the screenshot of the event was captured before the email of the event was sent;
   (c) determining an anomaly score for each of the events by applying an isolation forest to score each of the events relative to a baseline, wherein the score for each the events is based at least on the screenshot metadata and the message metadata for the event; and
   (d) determining that the anomaly score for at least one of the events exceeds an anomaly threshold,
   wherein multiple screenshots are captured prior to when the electronic message was sent, and the screenshot used to generate the event is one of the multiple screenshots, and
   wherein:
      of all the multiple screenshots, the screenshot used to generate the event was captured most recently to when the electronic message was sent, or
      at least one of the multiple screenshots was captured more recently to when the electronic message was sent than the screenshot used to generate the event.

22. A system comprising:
   (a) at least one processor; and
   (b) at least one memory communicatively coupled to the at least one processor, the at least one memory having stored thereon computer program code that is executable by the at least one processor and that, when executed by the at least one processor, causes the at least one processor to perform a method comprising:
      (i) obtaining message metadata and screenshot metadata;
      (ii) matching a screenshot corresponding to the screenshot metadata with an electronic message corresponding to the message metadata and having one or more file attachments to generate an event, wherein the screenshot metadata indicates that the screenshot was captured prior to when the message metadata indicates the electronic message was sent by a sender;
      (iii) determining an anomaly score for the event by applying unsupervised machine learning to score the event relative to a baseline; and
      (iv) determining that the anomaly score meets or exceeds an anomaly threshold,
   wherein multiple screenshots are captured prior to when the electronic message was sent, and the screenshot used to generate the event is one of the multiple screenshots, and
   wherein:
      of all the multiple screenshots, the screenshot used to generate the event was captured most recently to when the electronic message was sent, or
      at least one of the multiple screenshots was captured more recently to when the electronic message was sent than the screenshot used to generate the event.

* * * * *